May 21, 1929.  O. B. BJORGE  1,713,864
BLOCK FOR TRIPLINES AND THE LIKE
Filed July 24, 1926
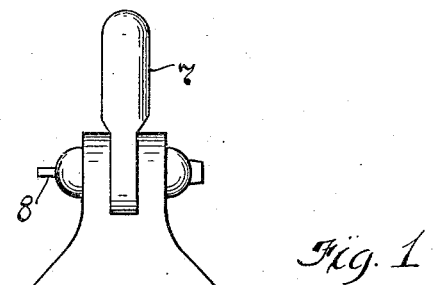
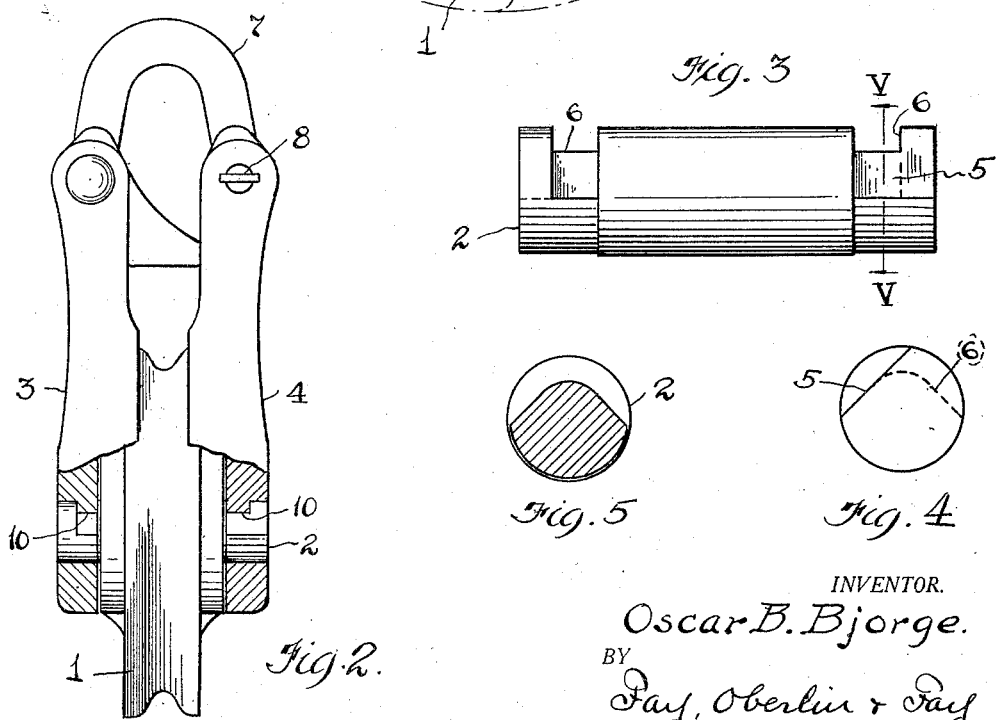
INVENTOR.
Oscar B. Bjorge.
BY
Fay, Oberlin & Fay
ATTORNEYS Patented May 21, 1929.

1,713,864

UNITED STATES PATENT OFFICE.

OSCAR B. BJORGE, OF PORTLAND, OREGON, ASSIGNOR TO CLYDE IRON WORKS, OF DULUTH, MINNESOTA, A CORPORATION OF MAINE.

BLOCK FOR TRIP LINES AND THE LIKE.

Application filed July 24, 1926. Serial No. 124,719.

This invention relates to hoisting equipment, and more particularly pulley-blocks and the like. Where large and heavy blocks are used under conditions requiring frequent moving and changing, as for instance in logging operations, it becomes a difficult matter to carry such blocks around. A block which can be easily and quickly taken apart and put together again, and such as to avoid misalignment and incorrect fit is accordingly highly desirable.

To the accomplishment of the foregoing and related ends, the invention, then, consists of the means hereinafter fully described, and particularly pointed out in the claims, the annexed drawing and the following description setting forth in detail certain features embodying the invention, such disclosed means constituting, however, but one of various forms in which the principle of the invention may be used.

In said annexed drawing:—

Fig. 1 is a side elevation of an embodiment of my invention; Fig. 2 is an edge view, partly in section; Figs. 3 and 4 are side and end elevations respectively of the sheave pin; and Fig. 5 is a section on a plane indicated by the line V—V, Fig. 3.

The reference character 1 in the drawing designates a sheave mounted on a pin 2, which is secured to the side members 3, 4. These side members are of dimension to partly enclose or house in the sheave, particularly its upper portion, and each member has an opening within which the end of the sheave pin is received. In its broader aspects, the invention contemplates an assembly in which the sheave pin is interlockably held in engagement with the side members, without resort to accessory nuts or other holding means. The sheave pin at each of its ends is shaped to engage a corresponding portion at the opening in the side members, and preferably the contour of the end of the pin is non-circular, conveniently there being a cutaway segment or flattened face, as at 5, and adjacent such portion, and inwardly from the end is an undercut 6 extending around through a further arc from such flattened face. By arranging the non-circular end portions and undercuts at an angular placement with respect to the two ends, for instance at an angle of 90°, the side members may be assembled with the pin so as to be non-removable when aligned in working position and joined by the shackle 7, which is riveted or bolted to one member in permanent assembly and is connected to the other member by a pin or bolt 8.

Correspondingly the holes 9 in the side members are of non-circular shape, for instance a segment 10 being left in the opening as a shoulder at the inner portion. It will thus be seen that the flattened face 5 of the end of the pin may slide along a shoulder segment 10, and on relative rotation of the members then, the shoulder 10 turns round into the undercut 6, and the pin and side member correspondingly are locked together.

Desirably the sheave and its bearing may be assembled with the pin 2 as a unit assembly, such that in further handling, these elements may be taken together. In this way interference with the bearing and access of dirt and grit is prevented. However, where preferred, the sheave may be entirely separable from the pin at will.

To assemble the device, one of the side members, for instance member 3 carrying the shackle 7 is slid onto the end of the pin 2, the shackle and pin being in such relative positions that the end of the pin, with its flattened face 5 slides into the non-circular opening 9 of the member. The other side member is turned so as to slide onto the other end of the pin, the flattened face 5 of the end slidable with respect to the shoulder segment 10. In the particular relationship shown in Fig. 1, the segments 10 in the side members being at right angles to each other, on assembly, the side members are initially engaged with the pin, in position indicated by the dotted lines. By now turning the two side members into co-alignment and inserting the pin 8 through the lugs of the side member and the opening in the end of the shackle 7, the block is ready for use. Separation of the side members and pin is impossible, as seen, on account of the interlocking engagement of the segments 10 in the undercuts 6. To disassemble the device, the pin 8 is withdrawn, a cotter pin or the like which customarily is used to retain this in position having been first removed, and the shackle 7 is then released from side member 4 and by turning the side members relatively to each other to the position to free the locking segments 10 from the undercuts, the side members may be slid off from the ends of the pin, and the device, now in three general parts, may be conveniently carried to its next place of use.

The precise form of the contour of the ends of the pin and the coacting openings of the side members and the undercuts may be varied from the illustrative form shown, but in general the simpler the form of such engaging portions, the more durable and satisfactory the device will be.

Other modes of applying the principle of my invention may be employed instead of that explained, change being made as regards the features herein disclosed, provided the means stated by any of the following claims or the equivalent of such stated means be employed.

I therefore particularly point out and distinctly claim as my invention:

1. In a device of the character described, the combination of side members having openings circular except for an obstructing shoulder segment, and a sheave pin having its ends correspondingly circular shaped with a segmental portion cut away and undercuts extending through an adjacent portion, such shaped ends being oriented at an angle with respect to each other.

2. In a device of the character described, the combination of side members having openings circular except for an obstructing shoulder segment, such segments being oriented substantially 90° apart in the respective side members, and a sheave pin having its ends correspondingly shaped with a flattened side and undercuts extending through a further portion, whereby on assembly with the respective side members and final alignment of such members the device is interlockably held together.

Signed by me this 21st day of July, 1926.

OSCAR B. BJORGE